US011066015B2

(12) United States Patent
Seitz (10) Patent No.: US 11,066,015 B2
(45) Date of Patent: Jul. 20, 2021

(54) ADJUSTABLE MIRROR ASSEMBLY FOR A WORK MACHINE (71) Applicant: Caterpillar Inc., Deerfield, IL (US)

(72) Inventor: Kris Edward Seitz, Bethany, IL (US)

(73) Assignee: Caterpillar Inc., Peoria, IL (US)

( * ) Notice: Subject to any disclaimer, the term of this patent is extended or adjusted under 35 U.S.C. 154(b) by 99 days.

(21) Appl. No.: 16/186,152

(22) Filed: Nov. 9, 2018

(65) Prior Publication Data
US 2020/0148116 A1   May 14, 2020

(51) Int. Cl.
*B60R 1/07* (2006.01)
*B60R 1/06* (2006.01)
*G02B 7/182* (2021.01)

(52) U.S. Cl.
CPC .............. *B60R 1/07* (2013.01); *B60R 1/0605* (2013.01); *B60R 1/0612* (2013.01); *G02B 7/182* (2013.01)

(58) Field of Classification Search
CPC ......... B60R 1/07; B60R 1/0612; B60R 1/003; B60R 1/0605; B60R 1/072; G02B 7/182; A47B 81/061
USPC ................ 359/876; 248/479–480, 485–487
See application file for complete search history.

(56) References Cited

U.S. PATENT DOCUMENTS

| 5,111,125 A | * | 5/1992 | Barrs ........................ B60R 1/07 |
| | | | 318/466 |
| 9,199,577 B1 | | 12/2015 | Messina et al. |
| 9,868,399 B1 | * | 1/2018 | Ebert ..................... B60R 1/072 |
| 9,956,916 B2 | | 5/2018 | Dalton et al. |
| 2014/0192432 A1 | | 7/2014 | Dalton et al. |

FOREIGN PATENT DOCUMENTS

| KR | 20150130024 | 11/2015 |
| WO | 2011035382 | 3/2011 |
| WO | 2013166265 | 11/2013 |

OTHER PUBLICATIONS

Speirs, Scott; Mine Innovations M129 Electric Mirror (Full video at https://youtu.be/tsViwZ0Q2kw) Mar. 27, 2013; 15 pages.

* cited by examiner

*Primary Examiner* — Kristina M Deherrera
(74) *Attorney, Agent, or Firm* — von Briesen & Roper, s.c.

(57) ABSTRACT

In accordance with one aspect of the present disclosure an adjustable mirror assembly for a work machine is disclosed. The adjustable mirror assembly includes a support bracket adapted to be attached to the work machine and an intermediate bracket. The intermediate bracket interfaces with a back surface of a mirror and with the support bracket. The adjustable mirror assembly includes a first linear actuator for rotating the mirror about a pitch axis. The first linear actuator to rotate the mirror about a pitch axis attaches to the support bracket and to the intermediate bracket. A second linear actuator to rotate the mirror about a yaw axis is attached to a point fixed to the intermediate bracket and to the back surface of the mirror.

20 Claims, 9 Drawing Sheets

ADJUSTABLE MIRROR ASSEMBLY FOR A WORK MACHINE

TECHNICAL FIELD

The present disclosure generally relates to adjustable mirror assemblies for work machines, such as large mining trucks.

BACKGROUND

Work machines, such as large mining trucks, are equipped with large mirrors to permit an operator to see the surroundings of the machine as it navigates about a worksite. Adjustment of the mirrors is required as different operators of the work machines prefer to have the mirrors located at different positions (e.g., rotated at different positions about a pitch axis and a yaw axis). Adjustment of a mirror manually may be take an appreciable amount of time and may even require multiple people to reposition the mirrors on a work machine given the size and the height of the mirrors above the ground for the different work machines. For example, the present assignee manufactures a large mining truck which can be fifty feet long, weigh over a million pounds, and include mirrors which are twenty feet off the ground.

U.S. Pat. No. 9,956,916 entitled "Truck Mirror Positioning Device," provides for adjusting the position of a rearview truck mirror and includes a mounting bracket adapted to be attached to the truck external to the truck driver's cabin. A pivotal support means is provided to mechanically couple to the mounting bracket for substantially supporting the weight of the truck mirror. An electric motor is mounted on the mounting bracket for moving the mirror and a gearbox is mechanically coupled to the motor and adapted to be mechanically coupled to the truck mirror so as to adjust the plane in which the mirror lies. The operator adjusts the angle of the mirror by activating the electric motor.

While arguably effective for its intended purpose there is still need for improved adjustable mirror assemblies for work trucks.

SUMMARY

In accordance with one aspect of the present disclosure, an adjustable mirror assembly for a work machine is disclosed. The adjustable mirror assembly includes a support bracket adapted to be attached to the work machine and to an intermediate bracket. The intermediate bracket is configured to interface with a back surface of a mirror at an upper connection point and a lower connection point and interface with the support bracket at an inner connection point and an outer connection point. The adjustable mirror assembly includes a first linear actuator for rotating the mirror about a pitch axis. The first linear actuator attaches to the support bracket at a first-linear actuator proximal end and attaches to the intermediate bracket at a first-linear actuator distal end. A second linear actuator is configured to rotate the mirror about a yaw axis and attaches to a point fixed to the intermediate bracket at a second-linear actuator proximal end and attaches to the back surface of the mirror at a second-linear actuator distal end.

In another aspect of the present disclosure, an adjustable mirror assembly kit includes a support bracket adapted to be attached to a work machine, a plurality of angled brackets, a plurality of electric linear actuators, and a mounting bracket. The support bracket includes a primary linear-actuator connection point on a first end, a secondary linear-actuator connection point located on a second end, a primary intermediate bracket connection point located on the second end, and a secondary intermediate bracket connection point located on the first end. The intermediate bracket is configured to interface with a back surface of a mirror at an upper connection point and a lower connection point and to interface with the support bracket at an inner connection point and an outer connection point. Each one of the plurality of angled brackets is configured to be installed as one of the upper connection point, the lower connection point, the inner connection point, and the outer connection point. Each one of the plurality of electric linear actuators are configured to be installed to control rotation of the mirror about a pitch axis and a yaw axis. The mounting bracket is configured to attach to a first extension arm of the intermediate bracket, a second extension arm of the intermediate bracket, and one of the plurality of electric linear actuators installed to control rotation of the mirror about the pitch axis.

In yet another aspect of the present disclosure, an adjustable mirror assembly for a work machine includes a support bracket adapted to be attached to the work machine and an intermediate bracket having a first extension arm and a second extension arm. The intermediate bracket is configured to interface with a back surface of a mirror at an upper connection point and a lower connection point and interface with the support bracket at an inner connection point and an outer connection point. The adjustable mirror assembly also includes a first electric linear actuator for rotating the mirror about a pitch axis that extends through the upper connection point and the lower connection point and a second electric linear actuator for rotating the mirror about a yaw axis that extends through the inner connection point and the outer connection point. The first electric linear actuator attaches to the support bracket at a first electric-linear-actuator proximal end and attaches to the intermediate bracket at a first electric-linear-actuator distal end. The second electric linear actuator attaches to the intermediate bracket via a mounting bracket at a second electric-linear-actuator proximal end and attaches to the back surface of the mirror at a second electric-linear-actuator distal end. The mounting bracket connects to the first extension arm and the second extension arm.

These and other aspects and features of the present disclosure will be more readily understood when read in conjunction with the accompanying drawings.

DETAILED DESCRIPTION

Figure 1:
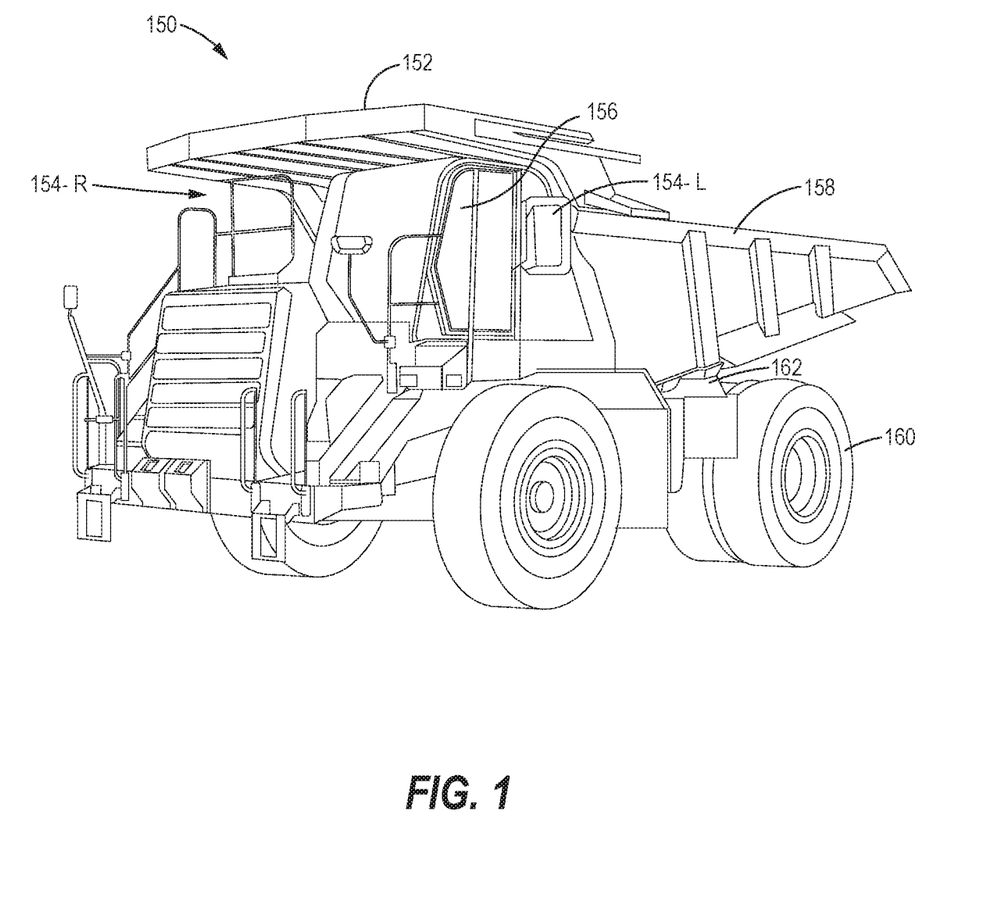
FIG. 1 is a perspective view of a work machine, in accordance with an embodiment of the present disclosure.

Referring now to the drawings, and with specific reference to FIG. 1, FIG. 1 depicts the view 150 of the work machine 152. The work machine 152 may be realized by a large mining truck, or the like. The work machine 152 includes a plurality of ground engaging members 160 that support a frame, or chassis, 162. The work machine 156 may be controlled by an operator located within the cabin 156. To assist the operator to see the surrounding areas of the work site, which may be blocked by the dump bed 158, the ground engaging members 160, and the like, the work machine may be equipped with mirrors. For example, the work machine 152 includes the mirror 154-L on the left-side of the machine (from the perspective of the operator) and the mirror 154-R on the right-side of the machine (not depicted in the perspective view 150. The mirrors 154-L and 154-R may be realized by adjustable mirrors, such as the adjustable mirror assemblies disclosed herein.

Figure 2:
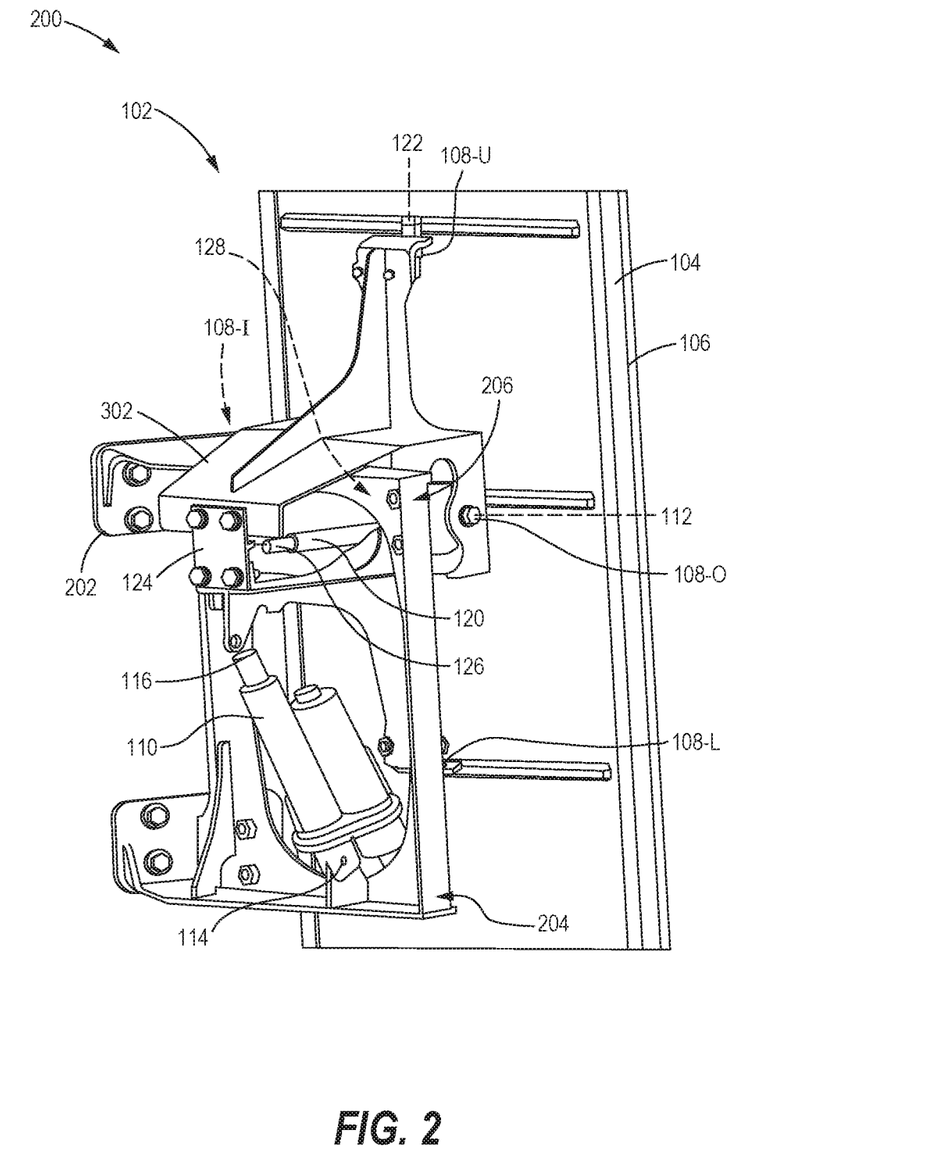
FIG. 2 is a perspective view of an adjustable mirror assembly, in accordance an embodiment of the present disclosure.

FIG. 2 depicts an adjustable mirror assembly, in accordance with an embodiment of the present disclosure. In particular, FIG. 2 depicts a perspective view 100 of an adjustable mirror assembly, in accordance an embodiment of the present disclosure. The perspective view 100 that includes components of the adjustable mirror assembly 102 including a support bracket 202, an intermediate bracket 302, a first linear actuator 110, and a second linear actuator 120. The view 100 also depicts the mirror 104 having a back surface 106. Not depicted is the front reflective surface of the mirror.

The intermediate bracket 302 of the adjustable mirror assembly 102 interfaces with the back surface 106 of the mirror 104 at an upper connection point 108-U and a lower connection point 108-L. The upper connection point 108-U and the lower connection point 108-L are aligned such that a yaw axis 122 extends through the upper connection point 108-U and the lower connection point 108-L. The adjustable mirror assembly 102 is configured to rotate the mirror 104 about the yaw axis 122 as discussed more fully below. Locating the yaw axis 122 in close proximity to the back surface 106 of the mirror 104 permits rotation of the mirror 104 that does not appreciably change the location of the mirror 104. Locating the yaw axis 122 at point further away from the mirror 104 may cause an undesirable alignment of the mirror 104 (e.g., a push of the mirror 104 forward or aft relative to the work machine) during rotation.

The intermediate bracket 302 further interfaces with the support bracket 202 at an inner connection point 108-I, not visible in the view 100, and the outer connection point 108-O. The inner connection point 108-I and the outer connection point 108-O are aligned such that a pitch axis 112 extends through the inner connection point 108-I and the outer connection point 108-O. The adjustable mirror assembly 102 is also configured to rotate the mirror 104 about the pitch axis 112 as discussed more fully below.

FIG. 2 also depicts the first linear actuator 110 extending between the support bracket 202 and the intermediate bracket 302. The first linear actuator 110, having a first-linear actuator proximal end 114 and a first-linear actuator distal end 116 is configured to rotate the mirror 104 about the pitch axis 112. The first-linear actuator proximal end 114 is attached to the support bracket 202 and the first-linear actuator distal end 116 is configured to be attached to the intermediate bracket 302. Extension or retraction of the first linear actuator 110 causes the intermediate bracket 302 to rotate, as the support bracket 202 is fixed to the work machine. The rotation of the intermediate bracket 302 causes the rotation of the mirror 104 about the pitch axis 112.

The second linear actuator 120, having a second-linear actuator proximal end 126 and a second-linear actuator distal end 128 (not depicted in the view 100), extends between the intermediate bracket 302 and the back surface 106 of the mirror 104 and is configured to rotate the mirror 104 about the yaw axis 122. The second-linear actuator proximal end 126 is attached to a point 124 (e.g., via a mounting bracket 502 discussed more fully below) to fix the second linear actuator 120 to the intermediate bracket 302. The second-linear actuator distal end 128 is attached to the back surface 106 of the mirror 104. It is envisioned that the support bracket 202 and the intermediate bracket 302 may be manufactured from steel, or other suitable metal, and have an outer finishing coating (e.g., paint, powder coating, chrome) to prevent corrosion.

Either one or both of the first linear actuator 110 and the second linear actuator 120 may be configured to extend and retract in response to receipt of a control signal. Example linear actuators may be realized by a 24 Volt electric linear actuator that is environmentally protected (e.g., has ingress protection, has a sealable electrical connection for control signals). The drive mechanism of the linear actuators may be either a worm drive, a ball screw, or the like. Additionally, the linear actuators may include an end of travel stop that is configured to stop extension or retraction of the linear actuator when an end stop is reached. Such an end of travel stop may prevent overheating of the linear actuator motor. It is to be appreciated that the first linear actuator 110 and the second linear actuator 120 may be any type of linear actuator. Example linear actuators include electric linear actuators, hydraulic linear actuators, pneumatic linear actuators, and the like. Control signals may also be varied according to the type of linear actuator utilized.

In some embodiments, either one or both of the first linear actuator 110 and the second linear actuator 120 may also be configured to reposition to one of a plurality of preset extension positions. In extending to a present extension position, the linear actuator is able to determine a proper orientation (e.g., pitch or yaw) of the mirror 104. Such a linear actuator may permit the work machine to reposition the mirror 104 based on a stored profile associated with the operator of the work machine. The first linear actuator 110 and the second linear actuator 120 may be realized by actuators of substantially the same design. For example, they may be identical part numbers from a common manufacturer, extend the same distance, operate on the same voltage, and the like. As such, either the first linear actuator 110 and the second linear actuator 120 may be interchangeable, or able to installed in place of each other, within the adjustable mirror assembly 102.

Figure 3:
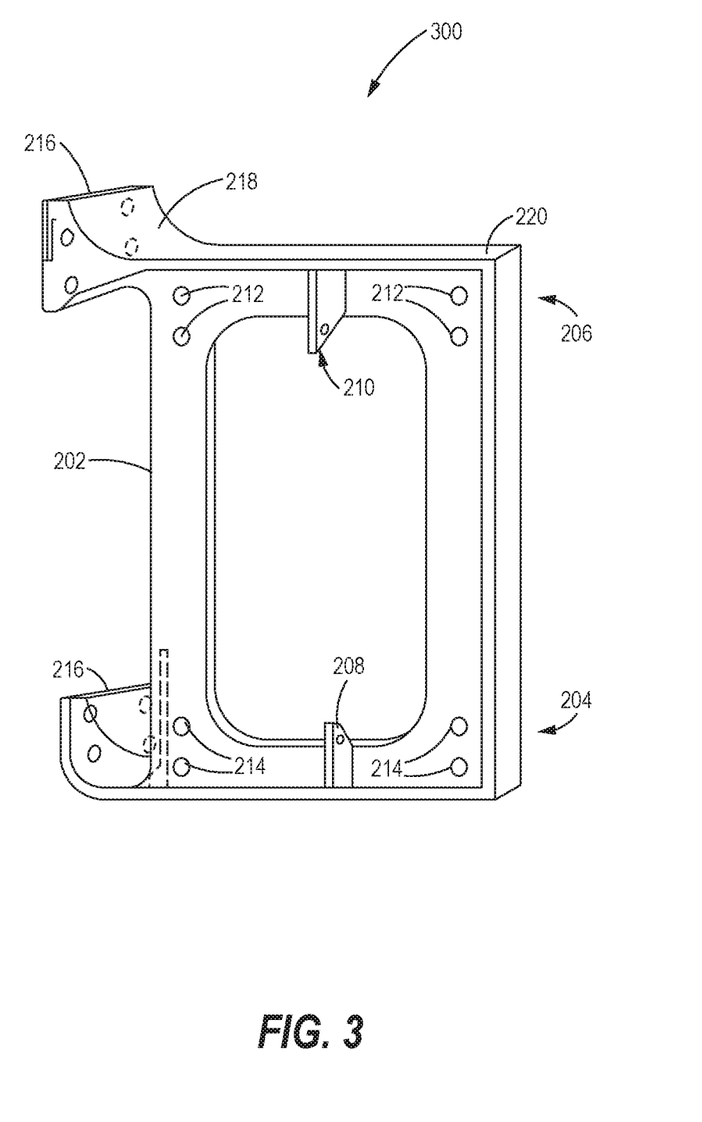
FIG. 3 is a perspective view of a support bracket, in accordance with an embodiment of the present disclosure.

FIG. 3 is a perspective view of a support bracket, in accordance with an embodiment of the present disclosure. In particular, FIG. 3 depicts the view 300 of the support bracket 202. The support bracket 202 includes a first end 204 depicted near the bottom of the view 300 and a second end 206 depicted near the top of the view 300. It is to be appreciated that the support bracket 202 may be assembled in either a right-side orientation or a left-side orientation for attachment to the work machine. As such many of the aspects of the support bracket 202 are vertically symmetrical to support either the first end 204 being located on top when installed, or with the second end 206 being located on top when installed.

Located on the first end 204 are a primary linear-actuator connection point 208 and a secondary intermediate bracket connection point 214. Located on the second end 206 are a secondary linear-actuator connection point 210 and a primary intermediate bracket connection point 212. Thus, when installed in a configuration such as that depicted in FIG. 2, a first-linear actuator proximal end 114 is attached to the primary linear-actuator connection point 208 and the intermediate bracket 302 is attached to the support bracket 202 at the primary intermediate bracket connection point 212. When installed in an opposite configuration as depicted in FIG. 2, the first-linear actuator proximal end 114 is attached to the secondary linear-actuator connection point 210 and the intermediate bracket 302 is attached to the support bracket 202 at the secondary intermediate bracket connection point 214.

The support bracket 202 includes a work machine connection point 216, which may be realized by a plurality of drilled holes. The work machine connection point 216 may be configured such that the support bracket 202 may be able to be retrofit into existing work machine designs. Attachment of the support bracket 202 to a work machine may be realized by inserting fasteners through the plurality of drilled holes of the work machine connection point 216, or per other means of attachment as known by those with skill in the art. The support bracket 202 extends from the work machine connection point 216 along the support-bracket arm 218 to the support bracket frame 220. The support-bracket arm 218 may be angled so that the support bracket frame 220 is angled towards the rear of the work machine. In some embodiments, the magnitude of the angle of the support-bracket arm 218 is 30 degrees. In yet other embodiments, the magnitude of the angle of the support-bracket arm 218 is between 10 degrees and 45 degrees. The angle of the support-bracket arm 218 permits proper orientation of the mirror 104 for an operator of the work machine.

Figure 4:
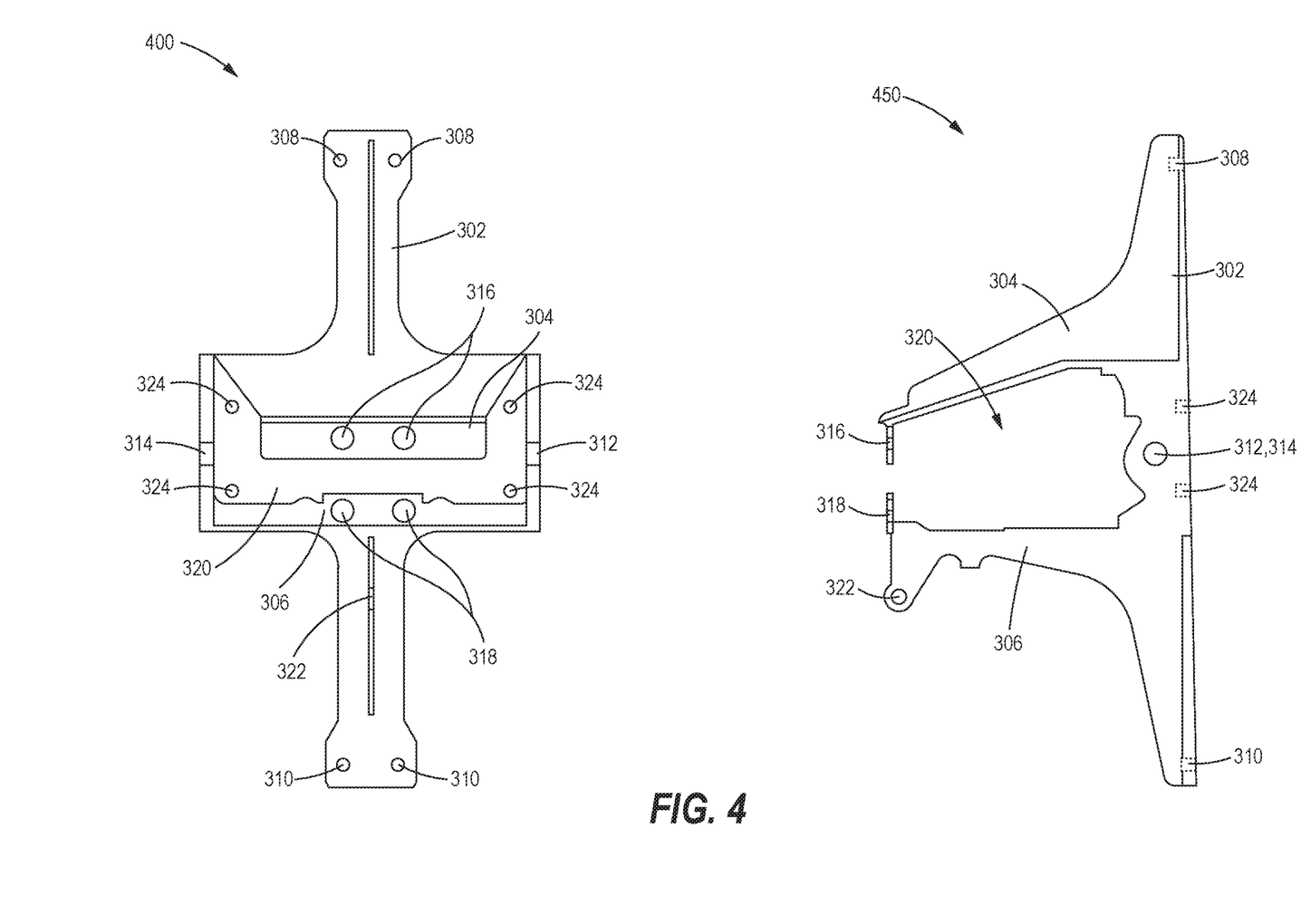
FIG. 4 is a top view and a side view of an intermediate bracket, in accordance with an embodiment of the present disclosure.

FIG. 4 is a top view and a side view of an intermediate bracket, in accordance with an embodiment of the present disclosure. In particular, FIG. 4 depicts the front view 400 and the side view 450 of the intermediate bracket 302. The intermediate bracket 302 connects to the support bracket 202 at the connection points 324, which may be realized as holes in the intermediate bracket 302. This may be realized by fasteners being inserted into the connection points 324. The intermediate bracket 302 connects to the upper connection point 108-U and the lower connection point 108-L at the connection points 308 and 310, respectively. The intermediate bracket 302 also connects to the inner connection point 108-I and the outer connection point 108-O at the connection points 312 and 314, respectively. As each of the connection points 108-U, 108-L, 108-I, and 108-O are located on the back surface 106 of the mirror 104, the connection points may all substantially be located in a single plane along the back surface 106 of the mirror.

The intermediate bracket 302 is able to be connected to the support bracket 202 when the adjustable mirror assembly 102 is being installed in either a right-side orientation or a left-side orientation. As such, the intermediate bracket 302 connection points 324 attach with either the primary intermediate bracket connection point 212 or the secondary intermediate bracket connection point 214, depending on the orientation of assembly.

The intermediate bracket 302 further includes a first extension arm 304 and a second extension arm 306. The first extension arm 304 and the second extension arm 306 generally extend from the plane realized by the connection points 108-U, 108-L, 108-I, and 108-L (e.g., to the left in the side view 450.) A cavity 320 is formed between the first extension arm 304 and the second extension arm 306. In some embodiments, the second linear actuator 120 is at least partially disposed in the cavity 320, (e.g., between the first extension arm 304 and the second extension arm 306) when installed into the adjustable mirror assembly 102. Positioning of these components within the cavity 320 permits a compact design of the adjustable mirror assembly.

Figure 5:
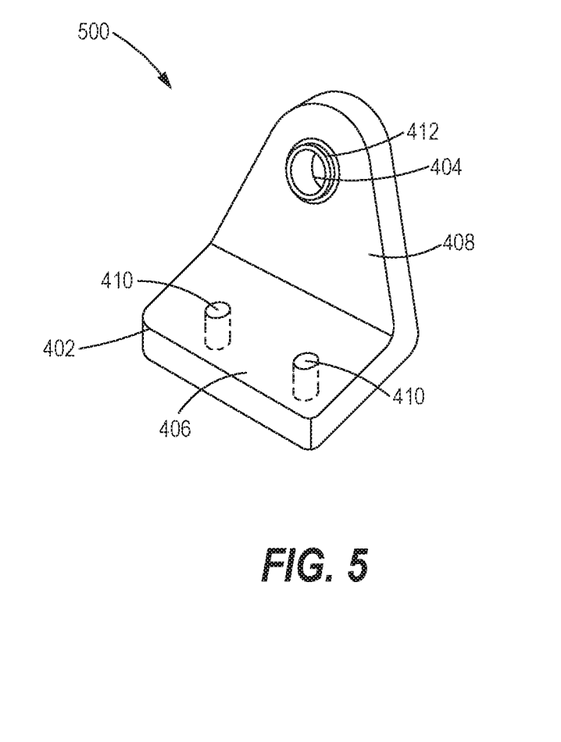
FIG. 5 is a perspective view of an angled bracket, in accordance with an embodiment of the present disclosure.

FIG. 5 is a perspective view of an angled bracket, in accordance with an embodiment of the present disclosure. In particular, FIG. 5 depicts the perspective view 500 of the angled bracket 402. The angled bracket 402 includes a first surface 406 that is at an angle to the second surface 408. As depicted in the view 500, the first surface 406 may be at a right angle to the second surface 408, although certainly other arrangements may be used. The first surface 406 includes a the attachment points 410 for connection to various components of the adjustable mirror assembly 102. For example, the angled bracket 402 may be installed as a component of either the inner connection point 108-I or the outer connection point 108-O and connect to the intermediate bracket 302 connection points 312 or 314, or the angled bracket 402 may be installed as a component of either the upper connection point 108-U or the lower connection point 108-L and connect to the intermediate bracket 302 connection points 308 or 310. The connection points 308, 310, 312, and 314 may be realized by a fastener system (e.g., a nut and bolt, a hardened pin) inserted through these connection points.

The second surface 408 includes a hole 404. When the adjustable mirror assembly 102 is assembled, the pitch axis 112 or the yaw axis 122 extends through the hole 404, depending in which connection point (108-U, 108-L, 108-I, or 108-O) the angled bracket 402 is installed. In some embodiments, the hole 404 may include a bearing assembly 412, which may be realized by a spherical plain bearing assembly. The spherical plain bearing assembly permits rotation in either a clockwise or a counter-clockwise direction. Installation of a bearing assembly 412 into the hole 404 permits for a greater tolerance error in aligning the connection points to permit smooth rotation of the mirror 104 about the pitch axis 112 and the yaw axis 122. The connection points with the bearing assembly 412 may further be realized by inserting a hardened smooth pin through the bearing assembly 412 and the associated connection point.

Figure 6:
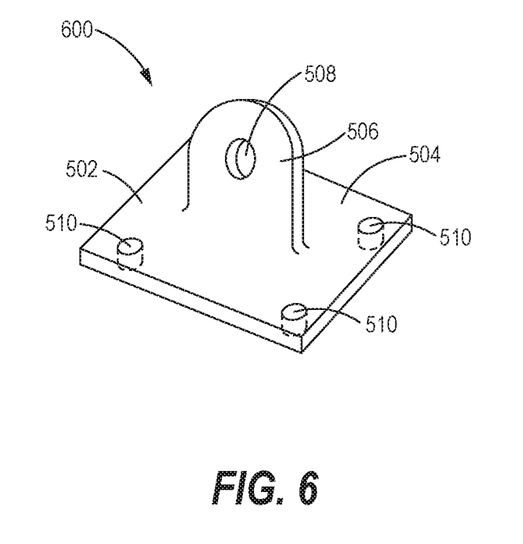
FIG. 6 is perspective view of a mounting bracket, in accordance with an embodiment of the present disclosure.

FIG. 6 is perspective view of a mounting bracket, in accordance with an embodiment of the present disclosure. In particular, FIG. 6 depicts the perspective view 600 of the mounting bracket 502. The mounting bracket 502 includes a first surface 504 having connection points 510 and a second surface 506, extending from the first surface 504, that has the connection point 508. When installed into the adjustable mirror assembly 102, the mounting bracket 502 may be oriented with the second surface 506 extending towards the back surface 106 of the mirror, such that the second linear actuator 120 may attach to the connection point 508.

Figure 7:
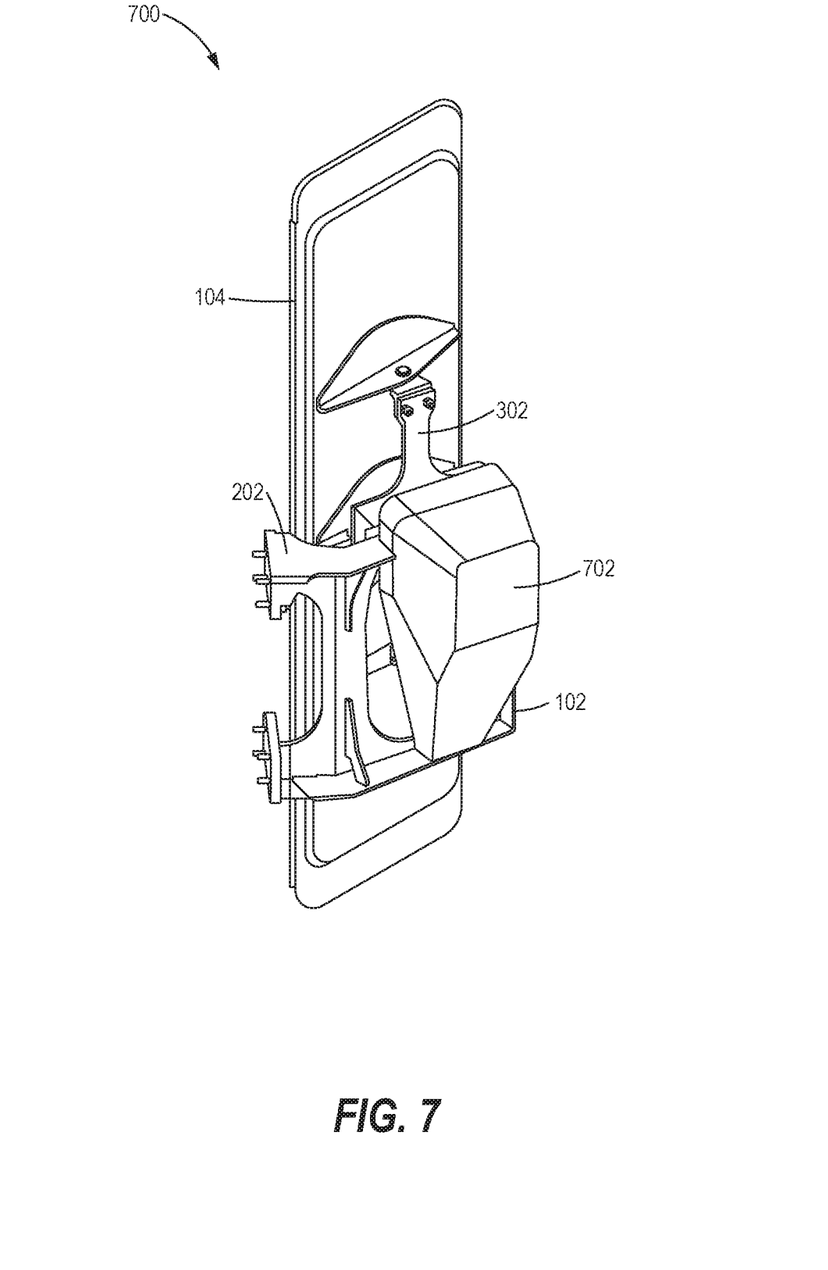
FIG. 7 is a perspective view an adjustable mirror assembly having a cover, in accordance with an embodiment of the present disclosure.

FIG. 7 is a perspective view an adjustable mirror assembly having a cover, in accordance with an embodiment of the present disclosure. In particular, FIG. 7 depicts the perspective view 700 of the adjustable mirror assembly 102 having a cover 702. The cover 702 is configured to enclose the first linear actuator 110, the second linear actuator 120, and the first extension arm 304 and the second extension arm 306 of the intermediate bracket 302. The cover 702 may comprise a plastic cover, that may be detachable, and provides for additional protection from water, dust, and debris for the covered components of the adjustable mirror assembly 102.

Figure 8:
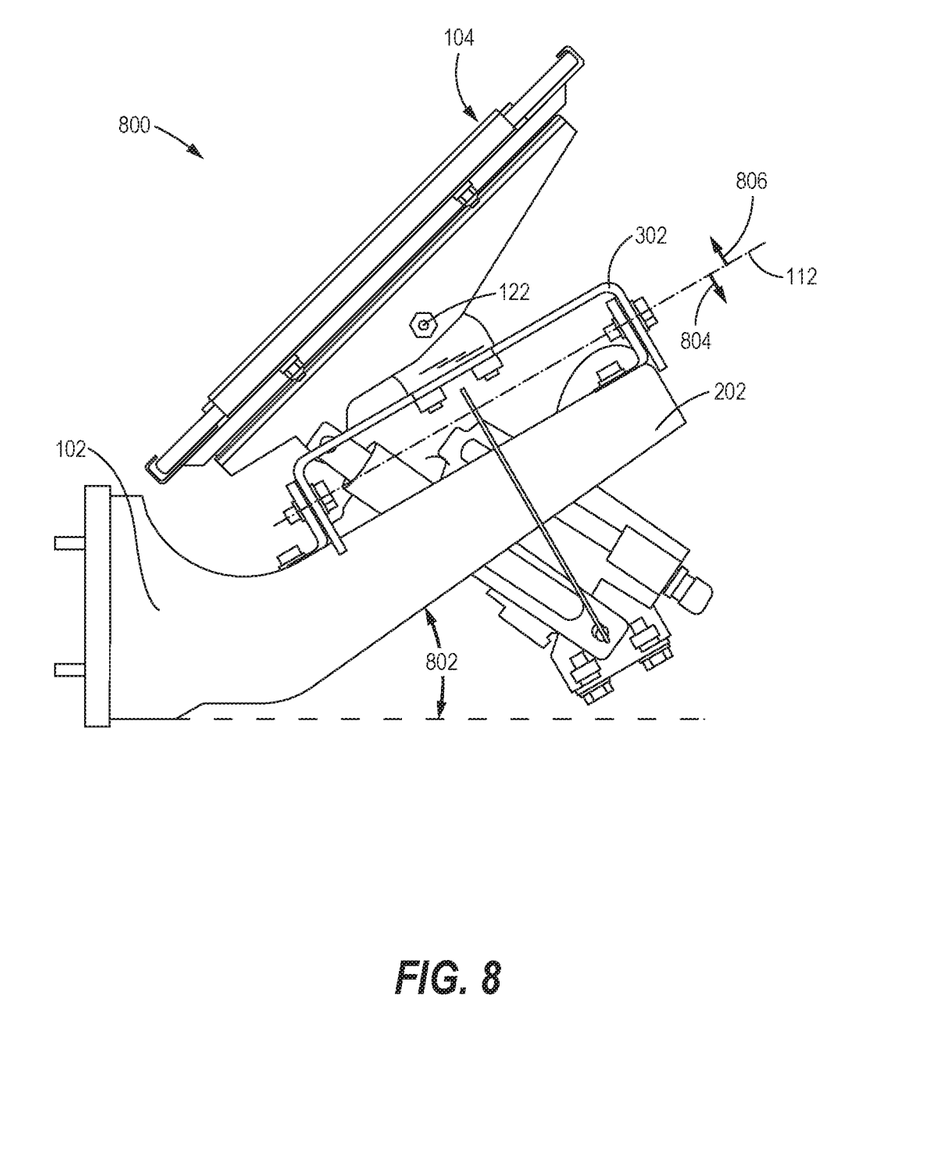
FIG. 8 is a top view of an adjustable mirror assembly, in accordance with an embodiment of the present disclosure.

FIG. 8 is a top view of an adjustable mirror assembly, in accordance with an embodiment of the present disclosure. In particular, FIG. 8 depicts the top view 800 of the adjustable mirror assembly 102. As depicted in the view 800, the support bracket 202 is angled to extend to the rear of the work machine. Here, the angle 802 is depicted at approximately 30 degrees of angle. In some embodiments, the adjustable mirror assembly 102 is configured to rotate the mirror 104 about the pitch axis 112 between +5 and −5 degrees from a nominal pitch angle, however other ranges may be used. For example, the rotation about the pitch axis 112 may be between +10 and −10 degrees, +15 and −15 degrees, and the like.

The adjustable mirror assembly 102 may also be configured to rotate the mirror 104 about the yaw axis 122 between +20 and −20 degrees from a nominal yaw angle, however other ranges may be used. For example, the rotation about the yaw axis 122 may be between +25 and −25 degrees, +30 and −30 degrees, and the like.

In some embodiments, the work machine includes two adjustable mirror assemblies 102, one on a left-side of the work machine and one on the right-side of the work machine. An operator of the work machine may be located in the cabin of a work machine, which may be located off the centerline of the work machine. As such, a left-side mounted adjustable mirror assembly and a right-side mounted adjustable mirror assembly may have different nominal pitch angles and nominal yaw angles and different desired ranges of rotation.

For example, when mounted in a right-side orientation, the adjustable mirror assembly 102 may be desired to rotate the mirror 104 about the yaw axis 122 between +13 and −13 degrees from a 37 degree nominal yaw angle. When mounted in a left-side orientation, the adjustable mirror assembly 102 may be desired to rotate the mirror 104 about the yaw axis 122 between +13 and −13 degrees about a 24 degree nominal yaw angle. As such, the design of the adjustable mirror assembly 102 that encompasses both of the desired amount of rotation about the yaw axis 122 is desirable such that one single adjustable mirror assembly 102 may be installed onto a work machine in either a right-side or left-side orientation.

In this example, when mounted in either the right-side orientation or a left-side orientations, the adjustable mirror assembly is desired to rotate through at least 26 degrees of motion. The difference between the nominal yaw angles in the left-side orientation and the right-side orientation is an additional 13 degrees. Thus, combining the total degrees of rotation (26 degrees from the range of motion plus 13 degrees from the difference in nominal angles) provides for a desired rotation of 39 degrees about a combined average yaw angle (of the nominal yaw angles in the right-side orientation and the left-side orientation) of 29.5 degrees. Thus, an adjustable mirror assembly 102 having an average yaw angle of 30 degrees and being configured to extend through +20 and −20 degrees of rotation would provide for the desired mirror positions when installed in either a right-side orientation or a left-side orientation.

The view 800 further includes a front portion 804 and a back portion 806, with the front portion 804 and the back portion 806 being located on opposite sides of the pitch axis 112. Based on the design of the adjustable mirror assembly 102 (e.g., size of components, positioning of the components, and the like), it may be appreciated that the location of a center of gravity of the adjustable mirror assembly 102 combined with the mirror 104 may be located substantially at (e.g., above or below) the pitch axis 112. Balancing the center of gravity of the adjustable mirror assembly 102 combined with the mirror 104 at the pitch axis 112 reduces loads and wear upon the linear actuators and prolongs the lifespan of the adjustable mirror assembly 102. This is particularly true of mirrors 104, that may be very large, and on work machines that operate experience severe vibrations on a work site.

Figure 9:
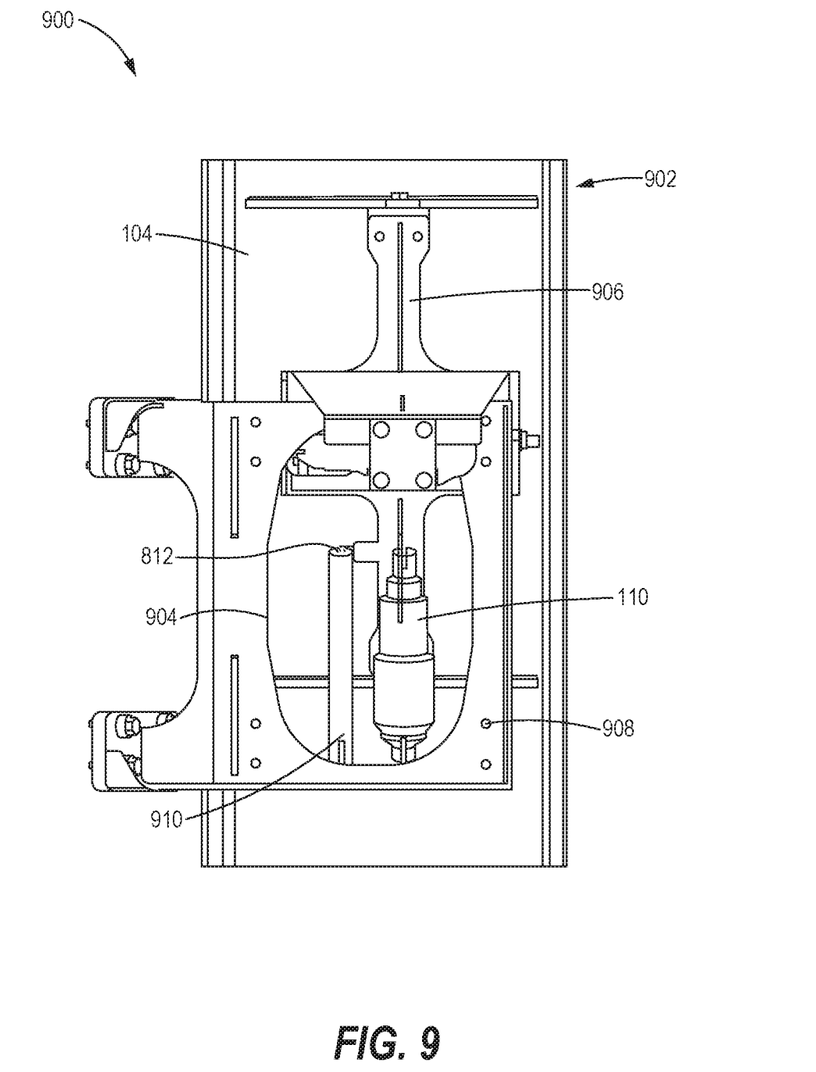
FIG. 9 is a front view of an adjustable mirror assembly having a damper, in accordance with an embodiment of the present disclosure.

FIG. 9 is a front view of an adjustable mirror assembly having a damper, in accordance with an embodiment of the present disclosure. In particular, FIG. 9 depicts the front view 900 of the adjustable mirror assembly 902 that is similar to the adjustable mirror assembly 102. The adjustable mirror assembly 902 includes the damper 904 that is mounted in parallel with the first linear actuator 110. Here, the first linear actuator 110 extends from the support bracket 908 (that is similar to the support bracket 202) to the intermediate bracket 906 (that is similar to the intermediate bracket 302). Here, the support bracket 908 is modified from the support bracket 202 to include a first attachment point 910 for the damper 904. The support bracket 908 may further include a secondary damper attachment point (not depicted) on the opposing side to support installation of the adjustable mirror assembly 902 in both a left-side and right-side orientation. The intermediate bracket 906 is modified from the intermediate bracket 302 to include a second attachment point 912 for the damper 904. As such, the damper 904 is configured to be installed parallel to the first linear actuator 110 to limit vibration forces from acting upon the first linear actuator 110.

INDUSTRIAL APPLICABILITY

In general, the teachings of the present disclosure may find applicability in various different work machine applications. For instance, the adjustable mirror assemblies disclosed herein may be utilized on a Large Mining Truck (LMT), an excavator, or any other large mobile machinery. It is appreciated that in addition to being manufactured with these adjustable mirror assemblies, many existing work machines may be retrofit with the adjustable mirror assemblies disclosed herein. As such, it is to be appreciated that the adjustable mirror assemblies may be delivered to customers in a kit for assembly and installation of the adjustable mirror assemblies at the customer's location.

Figure 10:
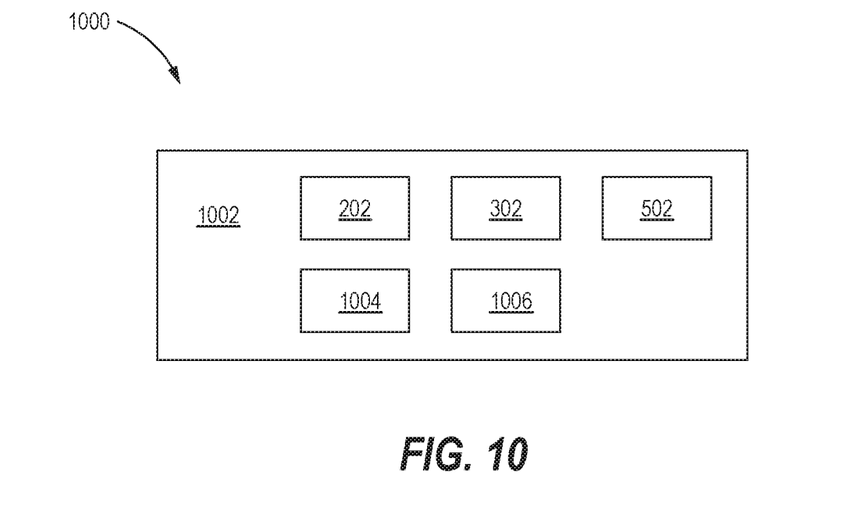
FIG. 10 is a block diagram of an adjustable mirror assembly kit, in accordance with an embodiment of the present disclosure.

FIG. 10 depicts a box diagram of a kit, in accordance with an embodiment of the present disclosure. In particular, FIG. 10 depicts the adjustable mirror assembly kit 1002 having a support bracket 202, an intermediate bracket 302, a plurality of angled brackets 1004, a plurality of electric linear actuators 1006, and a mounting bracket 502. The components of the kit 1002 may be assembled into an adjustable mirror assembly, such as the adjustable mirror assembly 102, disclosed herein.

The support bracket 202 is adapted to be attached to a work machine and includes a primary linear-actuator connection point 208 on a first end 204, a secondary linear-actuator connection point 210 located on a second end 206, a primary intermediate bracket connection point 212 located on the second end, and a secondary intermediate bracket connection point 214 located on the first end.

The intermediate bracket 302 is configured to interface with a back surface 106 of a mirror 104 at an upper connection point 108-U and a lower connection point 108-L. The intermediate bracket 302 is further configured to interface with the support bracket 202 at an inner connection point 108-I and an outer connection point 108-O.

The plurality of angled brackets 1004 may be realized by a plurality of angled brackets 402 discussed herein. In some embodiments, the plurality of angled brackets 1004 comprises four angled brackets 402 to be assembled in each of the connection points 108-U, 108-L, 108-I, and 108-O. The plurality of angled brackets 1004 may be realized by angled brackets of substantially the same design, such that they are interchangeable between being installed into each of the different connection points.

The electric linear actuators in the plurality of electric linear actuators 1006 are configured to be installed to control rotation of the mirror 104 about either a pitch axis 112 or a yaw axis 122. In one such embodiment, a first one of the plurality of electric linear actuators 1006 is installed as the first linear actuator 110, and a second one of the plurality of electric linear actuators 1006 is installed as the second linear actuator 120. The plurality of electric linear actuator 1006 may be realized by electric linear actuators that are substantially the same design, such that they are interchangeable between being installed into the adjustable mirror assembly as either the first linear actuator 110 or the second linear actuator 120.

The mounting bracket 502 is configured to attach to a first extension arm 304 of the intermediate bracket 302, a second extension arm 306 of the intermediate bracket 302, and one of the plurality of electric linear actuators 1006 that is installed to control rotation of the mirror 104 about the pitch axis 112.

In some embodiments, the same kit 1002 is configurable so as to be installed in either a right-side orientation and a left-side orientation using the same parts. When assembled in a right-side orientation, the support bracket 202 is configured to be installed to the work machine having the first end 204 located substantially below the second end 206, a first electric linear actuator of the plurality of electric linear actuators 1006 is connected to the primary linear-actuator connection point 208, and the intermediate bracket 302 is connected to the support bracket 202 at the primary intermediate bracket connection point 212.

When assembled in a left-side orientation, the support bracket 202 is configured to be installed to the work machine having the second end 206 located substantially below the first end 204, the first electric linear actuator of the plurality of electric linear actuators 1006 is connected to the secondary linear-actuator connection point 210, and the intermediate bracket 302 is connected to the support bracket 202 at the secondary intermediate bracket connection point 214. In either configuration, the assembled adjustable mirror assembly kit is configured to rotate about the yaw axis 122 between +20 and −20 degrees from a nominal yaw angle.

In some embodiments, the kit 1002 further includes the mirror 104. In some other embodiments, the kit 1002 includes a damper 904. In such embodiments, the support bracket 202 may be substituted with the support bracket 908 and the intermediate bracket 302 is substituted with the intermediate bracket 906 to enable mounting the support bracket 908 in parallel with the first linear actuator 110. It may be appreciated that additional hardware and instructions for assembly may also be included in the kit 1002. For example, hardened smooth pins may for use in the various connection points may also be included within the kit 1002. In some embodiments, the kit 1002 may only include the support bracket 202, the intermediate bracket 302, and the plurality of electric linear actuators 1006 and may not include the plurality of angled brackets 1004 nor the mounting bracket 502.

In addition to being delivered to a customer as an unassembled kit, the adjustable mirror assembly may also be delivered already assembled. The foregoing discussion of FIG. 11 discusses operation of an assembled adjustable mirror assembly that has been installed onto a work machine, (e.g., the work machine 152 of FIG. 1).

Figure 11:
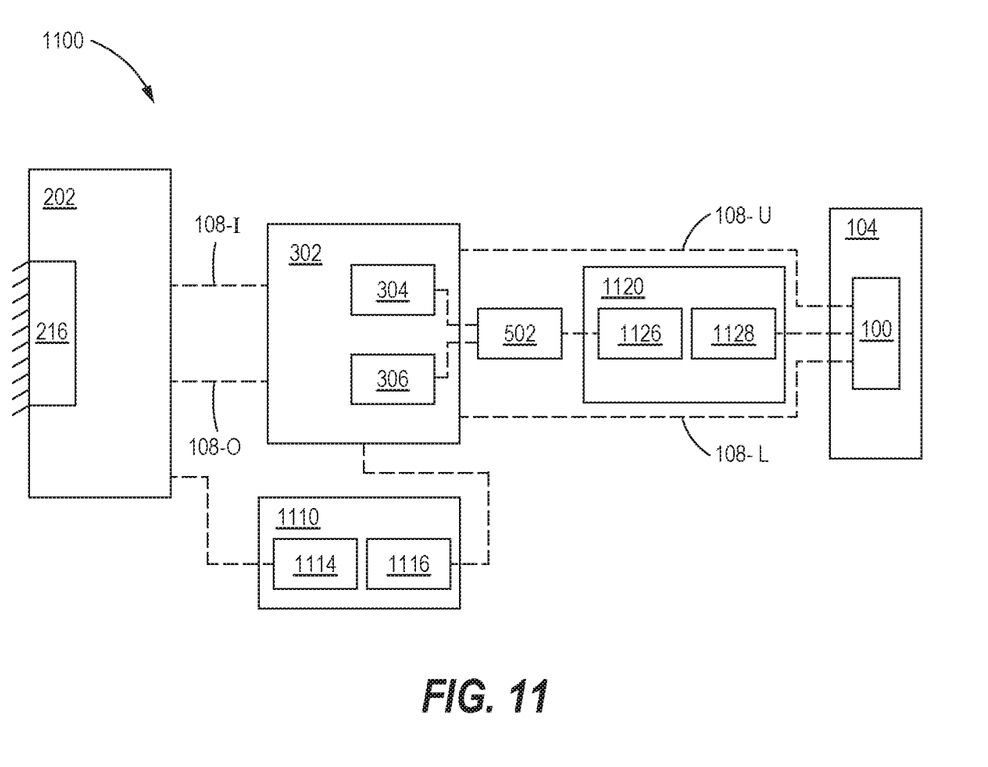
FIG. 11 is a block diagram of an adjustable mirror assembly, in accordance with an embodiment of the present disclosure.

FIG. 11 depicts a block diagram of an adjustable mirror assembly 1100. In particular, FIG. 11 depicts the block diagram of the adjustable mirror assembly 1100 that includes functional relationships of the various components. The adjustable mirror assembly 1100 includes a support bracket 202, an intermediate bracket 302, a first electric linear actuator 1110 for rotating a mirror 104 about a pitch axis 112, a second electric linear actuator 1120 for rotating the mirror about a yaw axis 122, and a mounting bracket 502 that is configured to be connected to the first extension arm 304 and the second extension arm 306 of the intermediate bracket 302. Here, the first electric linear actuator 1110 may be similar to the first linear actuator 110 and the second electric linear actuator 1120 may be similar to the second linear actuator 120.

The support bracket 202 is configured to be attached to a work machine via the work machine connection point 216. The work machine connection point 216 may be a fixed connection such that the support bracket 202 does not move relative to the work machine. The intermediate bracket 302 interfaces with a back surface 106 of the mirror 104 at the upper connection point 108-U and the lower connection point 108-L. The intermediate bracket 302 is also configured to interface with the support bracket 202 at the inner connection point 108-I and the outer connection point 108-O.

The first electric linear actuator 1110 has a first electric-linear-actuator proximal end 1114 that is attached to the support bracket 202 and a first electric-linear-actuator distal end 1116 that is attached to the intermediate bracket 302 (e.g., at the primary linear-actuator connection point 208 or the secondary linear-actuator connection point 210 based on the right-side/left-side orientation of the installation).

The second electric linear actuator 1120 has a second electric-linear-actuator proximal end 1126 that is attached to the intermediate bracket 302 via the mounting bracket 502. The second electric linear actuator 1120 also has a second electric-linear-actuator distal end 1128 that is attached to the back surface 106 of the mirror 104. As both the linear actuators extend and retract, their respective proximal ends and distal ends also extend and retract from each other, causing the movement of the components they are attached to, which thus rotates the mirror 104.

In some embodiments, the first electric linear actuator 1110 and the second electric linear actuator 1120 are configured to reposition (e.g., extend and retract) in response to signals received from the work machine. For example, the work machine may include an operator station that includes a user interface to generate the control signals for the adjustable mirror assemblies. The user interface may be realized as a four-position rocker switch, with a first one of the positions corresponding to generating a signal to extend the first electric linear actuator 1110, a second one of the positions corresponding to generating a signal to retract the first electric linear actuator 1110, a third one of the positions corresponding to generating a signal to extend the second electric linear actuator 1120, and a fourth one of the positions corresponding to generating a signal to retract the second electric linear actuator 1120. In another embodiment, the user interface may be realized by a joystick that is configured to generate the different control signals.

In yet another embodiment, the work machine includes one user interface for each (e.g., left-side and right-side) adjustable mirror assembly, although certainly a single user interface with a right-side and left-side selector switch may be used to generate the control signals. Finally, in embodiments with electric linear actuators that are configured to be positioned to one of a plurality of preset extension positions, the electric linear actuators may receive control signals from the work machine to reposition the mirror to a desired position based on an operator profile (e.g., an identify of an operator) of preferred mirror positions.

While the foregoing explanation of the adjustable mirror assembly 1100 is explained in detail below, it is appreciated that the teachings of this explanation may also be applied to any of the variations of the adjustable mirror assemblies disclosed herein.

In response to receiving an extension signal for the first electric linear actuator 1110, the first electric linear actuator 1110 will extend, and thus change the orientation of the intermediate bracket 302. Because the intermediate bracket 302 interfaces with the back surface 106 of the mirror 104 at the upper connection point 108-U and the lower connection point 108-L, the mirror rotates about the pitch axis 112 in a first direction. Responsive to receiving a retraction signal for the first electric linear actuator 1110, the first electric linear actuator 1110 retracts, and correspondingly causes the mirror 104 to rotate about the pitch axis 112 in a second direction that is opposite to the first direction.

In response to receiving an extension signal, or a retraction signal, for the second electric linear actuator 1120, the second electric linear actuator 1120 will extend, or retract, respectively. The extension, or retraction, of the second electric linear actuator 1120 will not cause a change of orientation of the intermediate bracket 302 relative to the support bracket 202 (or the work machine) as the intermediate bracket 302 is fixedly attached to the support bracket 202. However, the extension, or retraction, of the second electric linear actuator 1120 causes the mirror 104 to rotate about the yaw axis 122 in a first direction, or second direction, respectively.

It is to be noted, that in embodiments with electric linear actuators including an end of travel stop, the electric linear actuators will stop extending or retracting upon reaching an end of travel limit, thus preventing the mirror 104 from rotating about the pitch axis or yaw axis any further, despite receipt of control signals to continue to move the electric linear actuators beyond their end of travel limits.

What is claimed is:

1. An adjustable mirror assembly for a work machine, the adjustable mirror assembly comprising:
    a support bracket including:
        a first portion adapted to be attached to the work machine; and
        a first support bracket arm extending outward from the first portion and disposed at an inclined orientation relative to the first portion, the first support bracket arm including a frame that extends along and below a top of the first support bracket arm, the frame defining an opening therethrough;
    an intermediate bracket configured to: (a) couple to a back surface of a mirror at an upper connection point and a lower connection point; and (b) couple to the support bracket at an inner connection point and an outer connection point, the intermediate bracket including:
        a first extension arm disposed below the upper connection point and extending transversely across the first support bracket arm and the frame; and
        a second extension arm disposed above the lower connection point and extending through the opening of the frame and extending transversely across the first support bracket arm,
        wherein the first extension arm and the second arm define a cavity in which the first support bracket arm and the frame are disposed;
    a first linear actuator configured to rotate the mirror about a pitch axis, the first linear actuator coupled to the support bracket at a first linear actuator proximal end and coupled to the intermediate bracket at a first linear actuator distal end; and
    a second linear actuator configured to rotate the mirror about a yaw axis, the second linear actuator coupled to the intermediate bracket at a second linear actuator proximal end and configured to be coupled to the back surface of the mirror at a second linear actuator distal end.

2. The adjustable mirror assembly of claim 1, wherein a design of the angled bracket having the bearing assembly for the upper connection point, the lower connection point, the inner connection point, and the outer connection point is substantially identical.

3. The adjustable mirror assembly of claim 1, further comprising:
    a mounting bracket fixedly attached to the first extension arm and the second extension arm,
    wherein the second linear actuator is partially disposed between the first extension arm and the second extension arm.

4. The adjustable mirror assembly of claim 1, further comprising a plurality of angled brackets that each include a bearing assembly, wherein the upper connection point, the lower connection point, the inner connection point, and the outer connection point are each realized in part by one of the plurality of angled brackets, wherein a design of the angled bracket for the upper connection point, the lower connection point, the inner connection point, and the outer connection point is substantially identical.

5. The adjustable mirror assembly of claim 1, further comprising the mirror.

6. The adjustable mirror assembly of claim 5, wherein the mirror is rotatable about the pitch axis between +5 degrees and −5 degrees from a nominal pitch angle.

7. The adjustable mirror assembly of claim 5, wherein the mirror is rotatable about the yaw axis between +20 degrees and −20 degrees from a nominal yaw angle.

8. The adjustable mirror assembly of claim 5, further comprising an angled bracket that includes a bearing assembly, the angled bracket coupling:
    the intermediate bracket to the back surface of the mirror at the upper connection point; or
    the intermediate bracket to the back surface of the mirror at the lower connection point; or
    the intermediate bracket to the support bracket at the inner connection point; or
    the intermediate bracket to the support bracket at the outer connection point.

9. The adjustable mirror assembly of claim 1, wherein, when the support bracket is attached to the work machine, the frame is angled toward the rear of the work machine.

10. The adjustable mirror assembly of claim 1, wherein the first linear actuator and the second linear actuator are electric linear actuators.

11. The adjustable mirror assembly of claim 10, wherein the first linear actuator or the second linear actuator is extendable to a preset extension position.

12. The adjustable mirror assembly of claim 1, wherein the first linear actuator and the second linear actuator are of substantially the same design.

13. The adjustable mirror assembly of claim 1, wherein the first linear actuator or the second linear actuator further comprises an end of travel stop.

14. The adjustable mirror assembly of claim 1, further comprising a damper mounted to the support bracket and the intermediate bracket in parallel to the first linear actuator.

15. The adjustable mirror assembly of claim 1, wherein:
the yaw axis extends through the upper connection point and the lower connection point, the upper connection point and the lower connection point disposed on the back surface of the mirror; and
the pitch axis extends through the inner connection point and the outer connection point, the inner connection point and the outer connection point disposed on the intermediate bracket.

16. An adjustable mirror assembly kit, the adjustable mirror assembly kit comprising:
a support bracket, the support bracket including:
a first portion configured to be attached to the work machine; and
a first support bracket arm extending outward from the first portion and disposed at an inclined orientation relative to the first portion, the first support bracket arm including a frame that extends along and below a top of the first support bracket arm, the frame defining an opening therethrough,
wherein the support bracket has:
a primary linear-actuator connection point on a first end of the support bracket;
a secondary linear-actuator connection point located on a second end of the support bracket;
a primary intermediate bracket connection point located on the second end of the support bracket; and
a secondary intermediate bracket connection point located on the first end of the support bracket;
an intermediate bracket configured to: (a) couple to a back surface of a mirror at an upper connection point and a lower connection point and (b) couple to the support bracket at an inner connection point and an outer connection point, the intermediate bracket including:
a first extension arm configured to be disposed below the upper connection point and to extend transversely across the first support bracket arm and the frame; and
a second extension arm configured to be disposed above the lower connection point and to extend through the opening of the frame and to extend transversely across the first support bracket arm, wherein the first extension arm and the second extension arm are configured to define a cavity in which the first support bracket arm and the frame are disposed;
a plurality of electric linear actuators, the plurality of electric linear actuators configured to be installed to control rotation of the mirror about a pitch axis and a yaw axis; and
a mounting bracket configured to attach to the first extension arm of the intermediate bracket, the second extension arm of the intermediate bracket, and one of the plurality of electric linear actuators installed to control rotation of the mirror about the pitch axis.

17. The adjustable mirror assembly kit of claim 16, configurable to be installed in both a right-side orientation and a left-side orientation.

18. The adjustable mirror assembly kit of claim 17, wherein:
when assembled in the right-side orientation, the support bracket is configured to be installed to the work machine having the first end located substantially below the second end, a first electric linear actuator of the plurality of electric linear actuators is connected to the primary linear-actuator connection point, and the intermediate bracket is connected to the support bracket at the primary intermediate bracket connection point; and
when assembled in the left-side orientation, the support bracket is configured to be installed to the work machine having the second end located substantially below the first end, the first electric linear actuator of the plurality of electric linear actuators is connected to the secondary linear-actuator connection point, and the intermediate bracket is connected to the support bracket at the secondary intermediate bracket connection point.

19. The adjustable mirror assembly kit of claim 17, wherein the mirror is rotatable about the yaw axis between +20 degrees and −20 degrees from a nominal yaw angle.

20. An adjustable mirror assembly for a work machine, the adjustable mirror assembly comprising:
a support bracket including:
a first portion configured to be attached to the work machine;
a first support bracket arm extending outward from the first portion and disposed at an inclined orientation relative to the first portion, the first support bracket arm including a frame that extends along and below a top of the first support bracket arm, the frame defining an opening therethrough;
an intermediate bracket configured to: (a) couple to a back surface of a mirror at an upper connection point and a lower connection point and (b) couple to the support bracket at an inner connection point and an outer connection point, the intermediate bracket including:
a first extension arm disposed below the upper connection point and extending transversely across the first support bracket arm and the frame, the first extension arm inclined toward a second extension arm; and
the second extension arm disposed above the lower connection point and extending through the opening of the frame and extending transversely across the first support bracket arm,
wherein the first extension arm and the second extension arm define a cavity in which the first support bracket arm and the frame are disposed;
a first electric linear actuator configured to rotate the mirror about a pitch axis that extends through the inner connection point and the outer connection point, the first electric linear actuator coupled to the support bracket at a first electric linear actuator proximal end and coupled to the intermediate bracket at a first electric linear actuator distal end;

a second electric linear actuator configured to rotate the mirror about a yaw axis that extends through the upper connection point and the lower connection point, the second electric linear actuator coupled via a mounting bracket to the intermediate bracket at a second electric linear actuator proximal end and coupled to the back surface of the mirror at a second electric linear actuator distal end; and the mounting bracket connected to the first extension arm and the second extension arm.

\* \* \* \* \*